United States Patent
Phillips et al.

(10) Patent No.: US 7,498,930 B2
(45) Date of Patent: Mar. 3, 2009

(54) COMMUNICATIONS INTERFACE MODULE FOR VEHICLE

(75) Inventors: Timothy M. Phillips, Fenton, MI (US); Ronald H. Dybalski, Oxford, MI (US); Frederick J. Berg, Auburn, MI (US); Timothy J. Bennett, Kawkawlin, MI (US); Ashok Chandy, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 214 days.

(21) Appl. No.: 11/266,975

(22) Filed: Nov. 4, 2005

(65) Prior Publication Data

US 2007/0106822 A1    May 10, 2007

(51) Int. Cl.
*G01M 17/00* (2006.01)
*G06F 7/00* (2006.01)
*B60Q 1/00* (2006.01)
*B60L 1/00* (2006.01)
*B60L 3/00* (2006.01)
*H02G 3/00* (2006.01)

(52) U.S. Cl. ................... 340/438; 701/29; 307/10.1

(58) Field of Classification Search ......... 340/438–462; 701/29–49; 710/105, 106; 439/297; 307/10.1, 307/125, 139
See application file for complete search history.

(56) References Cited

U.S. PATENT DOCUMENTS

| | | | |
|---|---|---|---|
| 4,296,402 A | 10/1981 | Szczepanski | |
| 5,318,449 A * | 6/1994 | Schoell et al. | 434/305 |
| 5,808,373 A | 9/1998 | Hamanishi et al. | |
| 5,874,785 A | 2/1999 | Liu | |
| 5,892,434 A * | 4/1999 | Carlson et al. | 340/438 |
| 6,020,654 A | 2/2000 | Chutorash | |
| 6,042,414 A | 3/2000 | Kunert | |
| 6,188,140 B1 | 2/2001 | Kito | |
| 6,366,199 B1 * | 4/2002 | Osborn et al. | 340/438 |
| 6,445,084 B1 | 9/2002 | Daiss | |
| 6,504,710 B2 | 1/2003 | Sutton et al. | |
| 6,526,340 B1 * | 2/2003 | Reul et al. | 701/29 |
| 6,548,915 B1 | 4/2003 | Geber | |
| 6,582,033 B2 * | 6/2003 | Lesesky et al. | 303/122.02 |
| 6,583,373 B2 | 6/2003 | Ketzer et al. | |
| 6,587,767 B2 * | 7/2003 | Letang et al. | 701/29 |
| 6,608,399 B2 | 8/2003 | McConnell et al. | |
| 6,622,083 B1 * | 9/2003 | Knockeart et al. | 701/202 |
| 6,633,482 B2 | 10/2003 | Rode | |
| 6,667,687 B1 * | 12/2003 | DeZorzi | 340/447 |
| 6,696,932 B2 * | 2/2004 | Skibinski et al. | 340/438 |
| 6,700,219 B2 | 3/2004 | Hirschfeld et al. | |
| 6,788,528 B2 | 9/2004 | Enners et al. | |
| 6,939,155 B2 | 9/2005 | Postrel | |
| 7,277,007 B2 | 10/2007 | John et al. | |

(Continued)

*Primary Examiner*—Benjamin C Lee
*Assistant Examiner*—Jennifer Mehmood
(74) *Attorney, Agent, or Firm*—Thomas N. Twomey

(57) ABSTRACT

The invention provides a communications interface module mountable in a vehicle. The communications interface module includes a first electrical interface for electrically communicating with a control system of a vehicle. The communications interface module also includes a second electrical interface spaced from the first electrical interface for being positioned in a passenger compartment of a vehicle. The communications interface module includes a plurality of communication lines extending in parallel between the first electrical interface and the second electrical interface. The plurality of communication lines exchange a plurality of different communication formats between the first electrical interface and the second electrical interface.

22 Claims, 8 Drawing Sheets

U.S. PATENT DOCUMENTS

2005/0021190 A1   1/2005  Worrell et al.
2005/0171661 A1*  8/2005  Abdel-Malek et al. ........ 701/33
2007/0043488 A1*  2/2007  Avery et al. ................... 701/33

* cited by examiner

COMMUNICATIONS INTERFACE MODULE FOR VEHICLE

FIELD OF THE INVENTION

The invention relates to a system for establishing communication between a control system of a vehicle with an electronic peripheral device.

BACKGROUND OF THE INVENTION

The control system of a vehicle can monitor numerous categories and types of data during operation of the vehicle. The control system can receives signals from one or more velocity sensors to monitor vehicle speed, from one or more lateral acceleration sensors to monitor vehicle stability, from diagnostic sensors to monitor conditions such as temperature, pressure, and engine revolutions per minute. Also, the control system can monitor serial/parallel data as well as analog/digital signals The control system can also execute several different types of commands. For example, the control system can receive input from the driver and control the functions of an entertainment system of the vehicle. Also, the control system receive signals from vehicle sensors and execute commands. For example, the controller can receive a signal from a windshield rain sensor corresponding to rain and control the windshield wipers to engage.

Attempts have been made to tap into the control system of the vehicle with electronic peripheral devices. U.S. Pat. Nos. 6,633,482 and 6,788,528 disclose examples of such attempts.

SUMMARY OF THE INVENTION AND ADVANTAGES

The invention provides a communications interface module mountable in a vehicle. The communications interface module includes a first electrical interface for electrically communicating with a control system of a vehicle. The communications interface module also includes a second electrical interface spaced from the first electrical interface for being positioned in a passenger compartment of a vehicle. The communications interface module includes a plurality of communication lines extending in parallel between the first electrical interface and the second electrical interface. The plurality of communication lines exchange a plurality of different communication formats between the first electrical interface and the second electrical interface.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
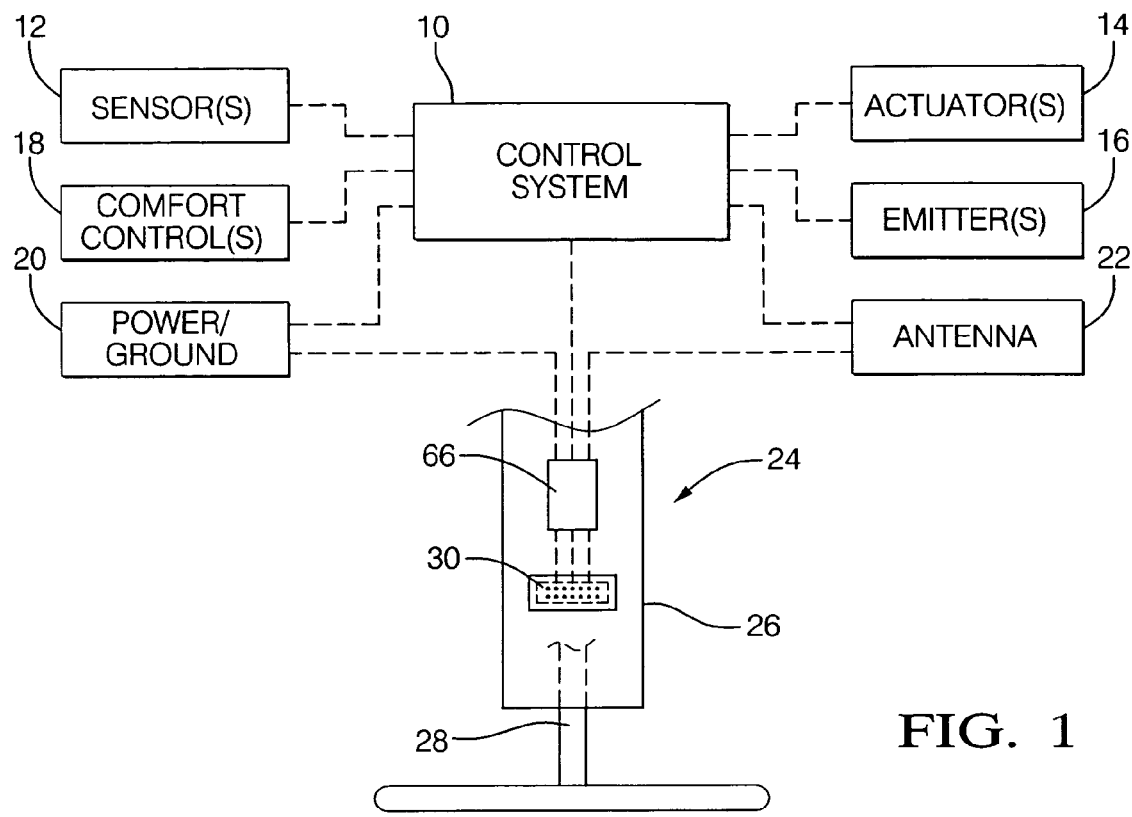
FIG. 1 is a schematic view of a vehicle interface system having a steering column assembly according to a first exemplary embodiment of the invention.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment or be added to other embodiments unless otherwise indicated by the drawings or this specification.

The invention relates to a system for establishing communication between a control system of a vehicle with an electronic peripheral device. Referring now to FIG. 1, a control system 10 of a vehicle can include a processor and memory for storing control programs. The control system 10 communicates with one or more sensors 12 disposed in the vehicle for receiving signals emitted by the sensors 12. The signals emitted by the sensors 12 correspond to conditions associated with the vehicle. For example, one or more sensors 12 can be disposed in the vehicle to sense conditions such as ambient light, the presence of moisture on a windshield of the vehicle, lateral acceleration, the global position of the vehicle, oil pressure, coolant temperature, exterior temperature, the temperature of the passenger compartment, engine revolutions per minute, quantity of fuel in the fuel tank, vehicle direction (compass).

Signals corresponding to one or more of these conditions can be emitted by one or more corresponding sensors 12 to the control system 10. Based on control logic stored in memory, the control system 12 can execute commands to appropriate actuators 14 or emitters 16. For example, if the sensor 12 detects the presence of moisture on a windshield of the vehicle, the control system 10 can control an actuator 12 in the form of windshield wipers to actuate and clear the windshield. In another example, if the sensor 12 detects lateral acceleration, the control system 10 can control actuators in the form of components of the brake system of the vehicle to execute a controlled brake event. By way of example and not limitation, the actuator 14 can also take the form of driving lights, locks, valves and pumps.

The control system 10 can also control emitters 16 that alert the driver to conditions sensed by the sensor 12. For example, if the sensor 12 senses a relatively small quantity of fuel in the fuel tank of the vehicle, the control system 10 can control an emitter 16 in the form of a light on a dashboard of the vehicle to emit light. By way of example and not limitation, the emitter 16 can emit visual signals, audio signals, textual messages, and/or graphic messages.

The control system 10 can also communicate with one or more comfort controls 18. Comfort controls 18 are electronic controls accessible to the driver to change a condition associated with the vehicle. Comfort controls 18 can be associated with climate control systems of the vehicle, navigation systems, audio visual systems, and/or safety systems. Comfort controls 18 can be in the form of buttons, knobs, and/or sliding members. The control system 10 can receive signals from the comfort control 18 and control an actuator 14 and/or an emitter 16 in response. By way of example and not limitation, actuators 14 and/or emitters 16 that can be controlled in response to signals emitted by comfort controls 18 include speakers, video screens, throttle control (cruise control), exterior and/or interior lights, windshield wipers, vents, valves, blower motors, pumps, locks, automatic doors, and window defoggers.

The control system 10 is electrically connected to a power/ground source 20. The control system 10 can control power flow to actuators 14 and/or emitters 16 to execute commands in response to signals received from sensors 12 or comfort controls 18. An antenna 22 can also be electrically connected to the control system 10. Alternatively, the antenna 22 may be connected directly to actuator 14 and/or an emitter 16, such as a radio or television disposed in the vehicle.

Referring now to FIG. 1, a steering column assembly 24 for a vehicle includes a steering column member 26 for supporting rotation of a steering shaft 28 in a vehicle. The steering column assembly 24 also includes a first electrical communication receptacle 30 fixed relative to the steering column member 26. The first electrical communication receptacle 30 receives an electronic peripheral device on the steering column member 26, such as any of the electronic peripheral devices 32a, 34a, 36c, 38c, 40c, 42c, 44a, set forth in greater detail below and shown in the various figures. The first electrical communication receptacle 30 electrically connects one of the electronic peripheral devices 32a, 34a, 36c, 38c, 40c, 42c, 44a with a control system 10 of the vehicle.

The steering column member 26 can be a steering column jacket and/or a tilt housing. The steering column member 26 can be adjustable in tilting movement, telescoping movement, raking movement or can be a stationary column. In embodiments of the invention wherein the steering column member 26 is adjustable, the first electrical communication receptacle 30 can be disposed for movement with the steering column member 26 during the tilting movement, the telescoping movement, or the raking movement.

The exemplary first electrical communication receptacle 30 is operable to communicate serial data and parallel data. The exemplary first electrical communication receptacle 30 can also communicate discrete signal, such as binary signals, and can communicate analog signals and/or digital signals. The first electrical communication receptacle 30 is also operable to communicate power from the power/ground source 20 to the electronic peripheral device. The first electrical communication receptacle 30 is also operable to communicate signals from the antenna 22 of the vehicle to the electronic peripheral device. As used herein, the first electrical communication receptacle 30 can be a male or female connector.

Referring now to FIGS. 2-5, 8 and 9, a second exemplary steering column assembly 24a for a vehicle includes a steering column member 26a for supporting rotation of a steering shaft in a vehicle, such as steering shaft 28 in FIG. 1. The steering column assembly 24a also includes a first electrical communication receptacle 30a fixed relative to the steering column member 26a. The first electrical communication receptacle 30a receives an electronic peripheral device on the steering column member 26a, such as any of the electronic peripheral devices 32a, 34a, 36c, 38c, 40c, 42c, 44a, set forth in greater detail below and shown in the various figures. The first electrical communication receptacle 30a electrically connects one of the electronic peripheral devices 32a, 34a, 36c, 38c, 40c, 42c, 44a with a control system of the vehicle, such as control system 10 shown in FIG. 1.

Figure 4:
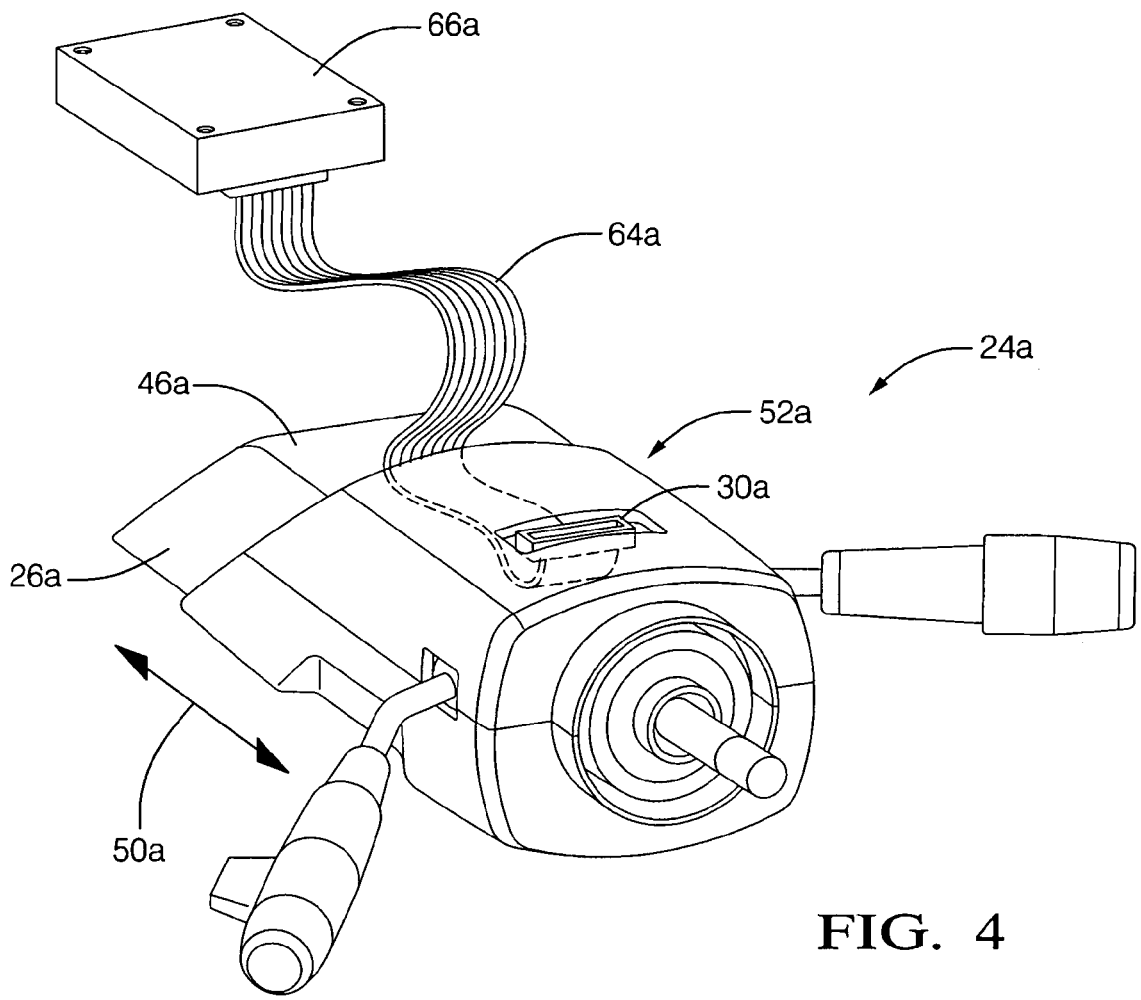
FIG. 4 is a perspective view a first exemplary communications interface module spaced from an electrical communication receptacle of an alternative embodiment of a steering column assembly and connected through a lead.

The steering column member 26a includes an upwardly facing surface 46a and the first electrical communication receptacle 30a is disposed adjacent to the upwardly facing surface 46a, best seen in FIG. 4. The steering column member 26a is adjustable in telescoping movement 50a and the first electrical communication receptacle 30a moves with the steering column member 26a during telescoping movement 50a. The steering column assembly 24a includes a shroud 52a at least partially covering the steering column member 26a. The first electrical communication receptacle 30a extends through the shroud 52a. In the second exemplary embodiment, the first electrical communication receptacle 30a is fixedly connected to the shroud 52a and the shroud 52a is fixedly connected to the steering column member 26a.

Figure 5:
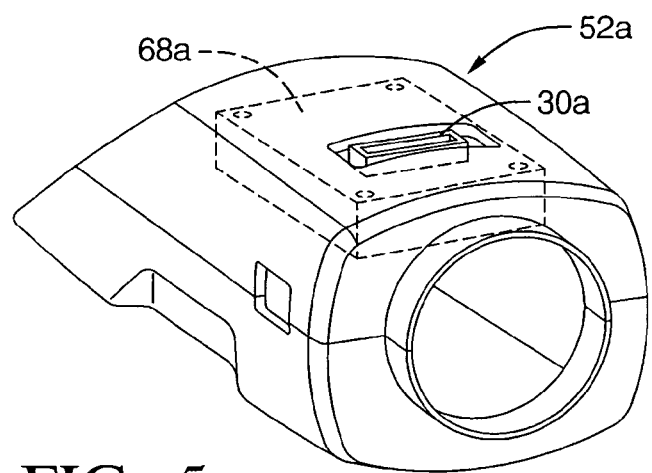
FIG. 5 is a perspective view a second exemplary communications interface module directly connected to an electrical communication receptacle of an alternative embodiment of a steering column assembly.

The steering column assembly 24a along includes a communication line 64a extending along the steering column member 26a for connecting with a control system of the vehicle. The communication line 64a extends from the first electrical communication receptacle 30a and under the shroud 52a to the control system of the vehicle. The exemplary communication line 64a extends to a communications interface module 66a, which will be described in greater detail below. In alternative embodiments of the invention, such as shown in FIG. 5, a communications interface module 68a otherwise the same as the communications interface module 66a can be directly connected to the first electrical communication receptacle 30a.

Figure 2:
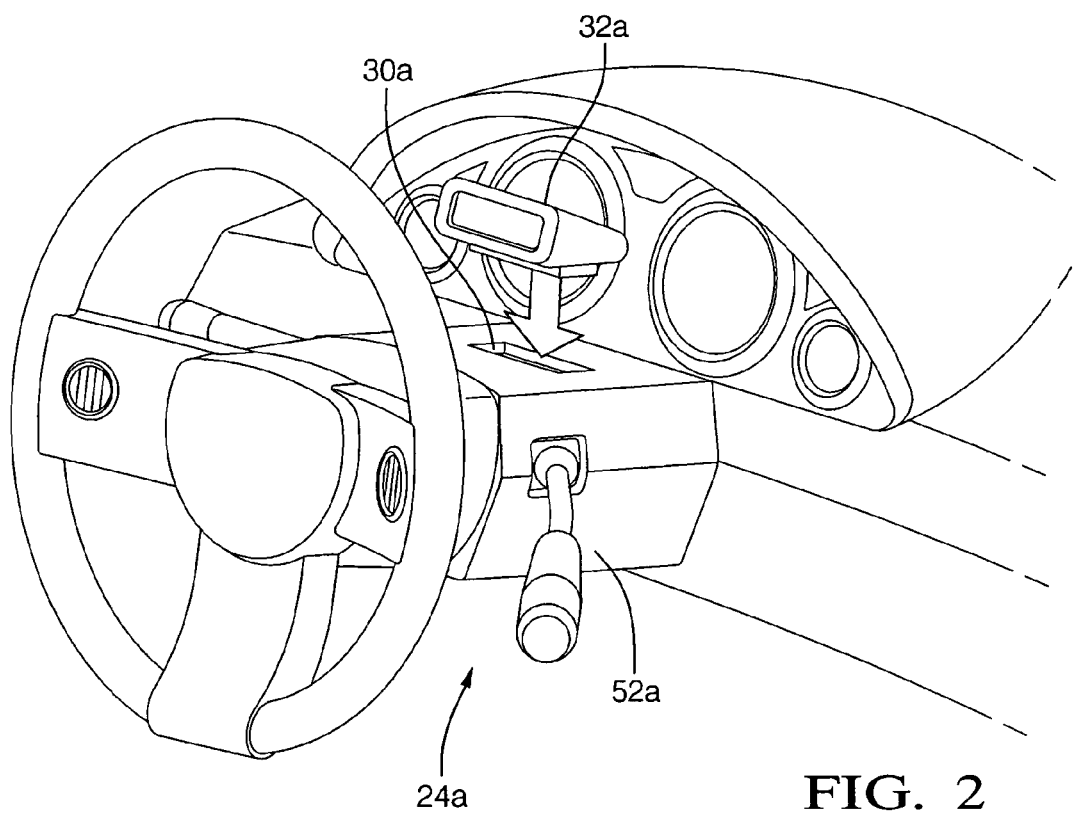
FIG. 2 is an exploded view of a second exemplary steering column assembly receiving a first exemplary electronic peripheral.
Figure 3:
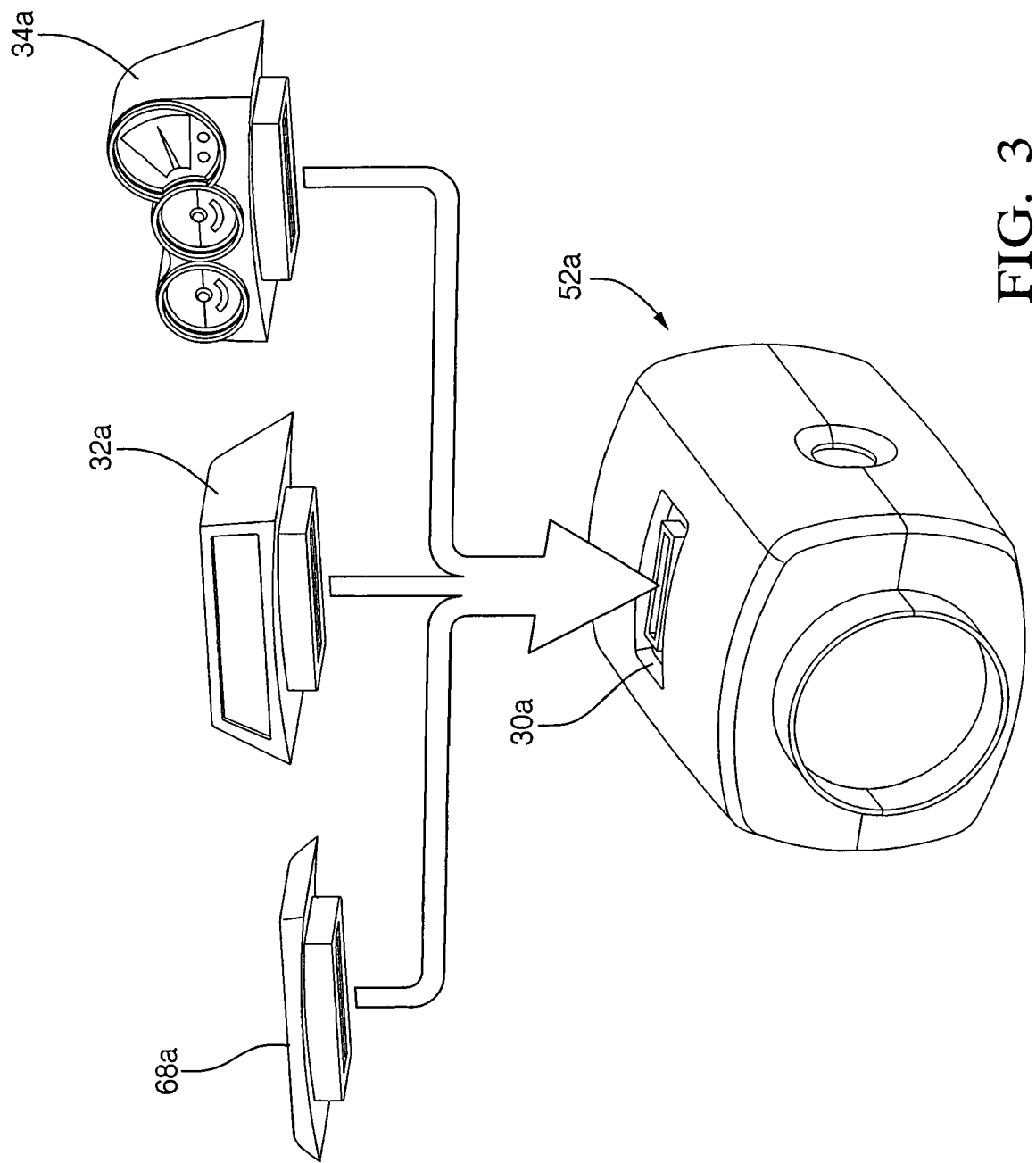
FIG. 3 is an exploded view of the second exemplary steering column assembly disposed to receive the first exemplary electronic peripheral or a second exemplary electronic peripheral or a dust cap.

Referring to FIGS. 2 and 3, the steering column assembly 24a can include any one of the electronic peripheral devices 32a, 34a, or any of the other electronic peripheral devices 36c, 38c, 40c, 42c, 44a, set forth in greater detail below and shown in the various figures. Each of the electronic peripheral devices 32a, 34a is engagable with the first electrical communication receptacle 30a and is operable to display vehicle diagnostic data. For example, the electronic peripheral devices 32a can display data is graphical form or as text. The data can correspond to any condition monitored by the control system of the vehicle such as engine revolutions per minute, coolant temperature, and/or oil pressure. The exemplary electronic peripheral device 34a is a gage cluster that includes a tachometer, an oil pressure gage, and a fuel gage. Either of the electronic peripheral devices 32a, 34a can be plugged into the first electrical communication receptacle 30a and communicate data to the driver. The first electrical communication receptacle 30a mechanically holds the received electronic peripheral device 32a or 34a and electronically communicates data between the electronic peripheral device 32a or 34a and the control system of the vehicle. A dust cap 68a can cover the first electrical communication receptacle 30a when neither of the electronic peripheral devices 32a, 34a is received.

Figure 6:
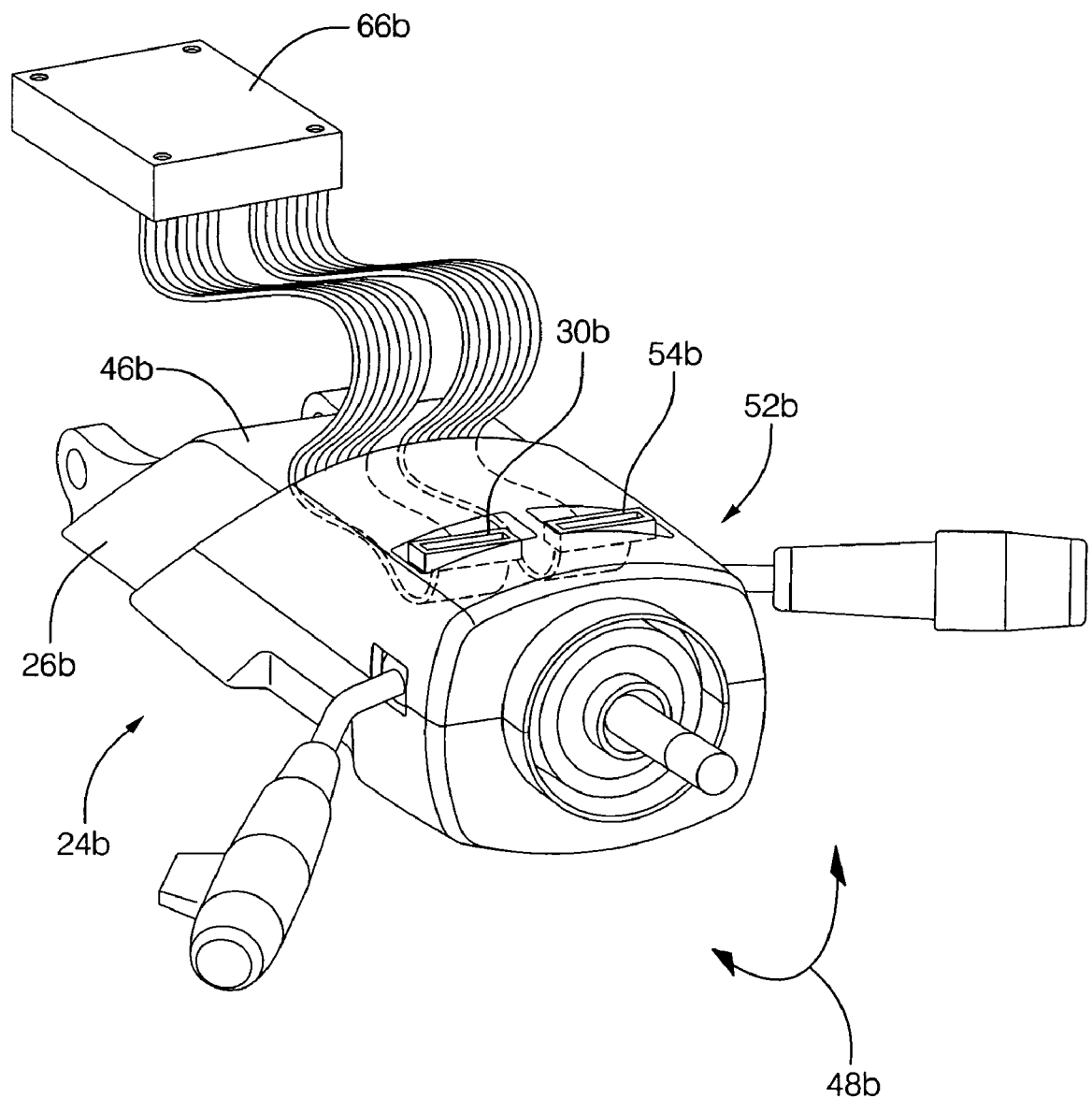
FIG. 6 is a perspective view of a third exemplary embodiment of a steering column assembly having first and second electrical communication receptacles.

Referring now to FIG. 6, a steering column assembly 24b for a vehicle includes a steering column member 26b for supporting rotation of a steering shaft in a vehicle, such as steering shaft 28 in FIG. 1. The steering column assembly 24b also includes a first electrical communication receptacle 30b fixed relative to the steering column member 26b. The first electrical communication receptacle 30b receives an electronic peripheral device on the steering column member 26b, such as any of the electronic peripheral devices 32a, 34a, 36c, 38c, 40c, 42c, 44a, set forth in greater detail below or above and shown in the various figures. The first electrical communication receptacle 30b electrically connects one of the electronic peripheral devices 32a, 34a, 36c, 38c, 40c, 42c, 44a with a control system of the vehicle, such as control system 10 shown in FIG. 1.

The steering column member 26b includes an upwardly facing surface 46b and the first electrical communication receptacle 30b is disposed adjacent to the upwardly facing surface 46b. The steering column member 26b is adjustable in tilting movement 48b and the first electrical communication receptacle 30b moves with the steering column member 26b during tilting movement 48b. The steering column assembly 24b includes a shroud 52b at least partially covering the steering column member 26b. The first electrical communication receptacle 30b extends through the shroud 52b.

The steering column assembly 24b also includes a second electrical communication receptacle 54b. The second electrical communication receptacle 54b is spaced from the first electrical communication receptacle 30b and fixed relative to the steering column member 26b. Either or both of the first electrical communication receptacle 30b and the second electrical communication receptacle 54b can be directly fixed to the steering column member 26b or can be fixed to another structures that is directly or indirectly fixed to the steering column member 26b, such as the shroud 52b. The second electrical communication receptacle 54b receives an electronic peripheral device, such as any one of the electronic peripheral devices 32a, 34a, 36c, 38c, 40c, 42c, 44a, on the steering column member 26b. The second electrical communication receptacle 54b electrically connects a received electronic peripheral device 32a, 34a, 36c, 38c, 40c, 42c, 44a with a control system of the vehicle. The first electrical communication receptacle 30b and the second electrical communication receptacle 54b can concurrently receive different electronic peripheral devices 32a, 34a, 36c, 38c, 40c, 42c, 44a.

Figure 7:
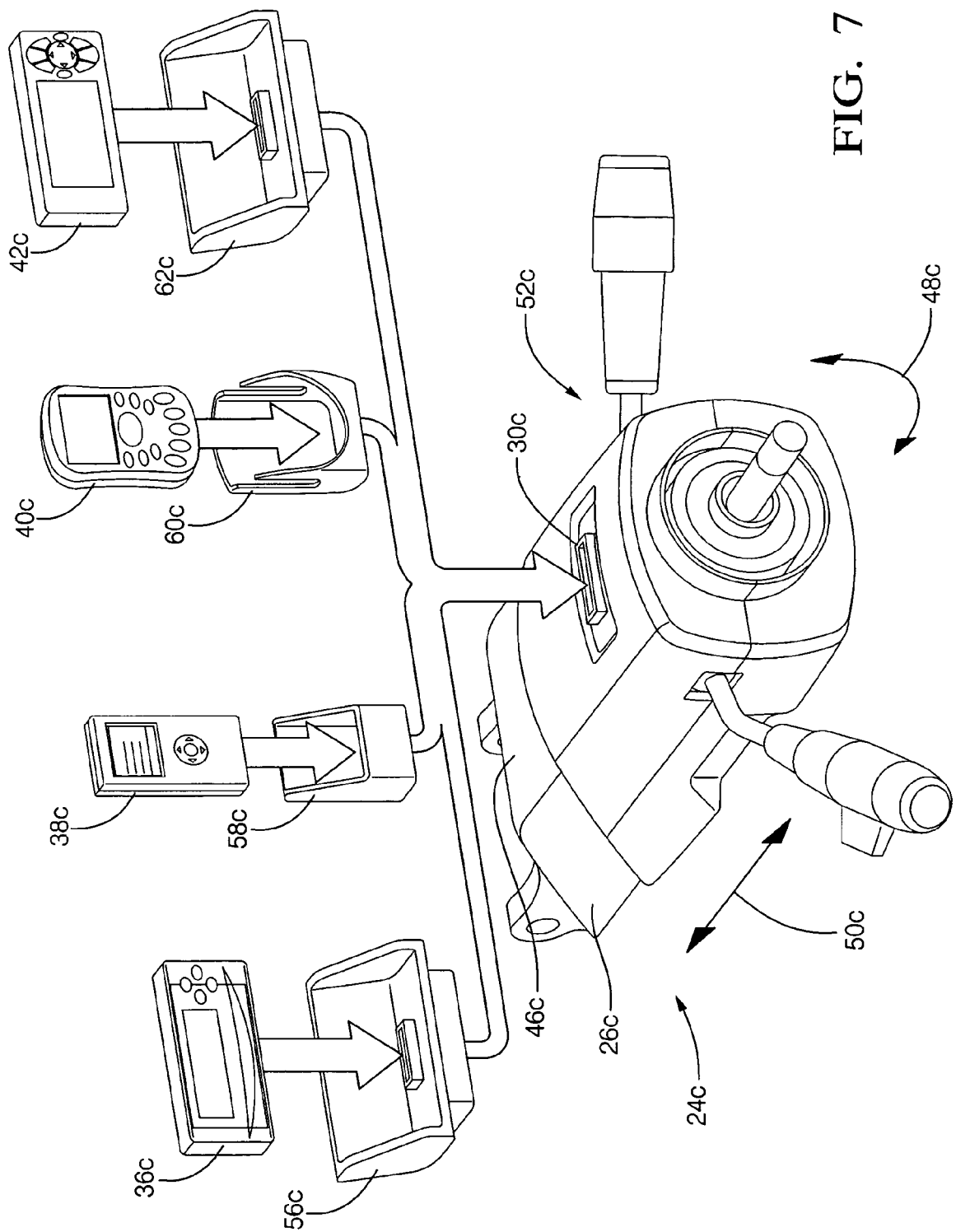
FIG. 7 is a perspective view of a fourth exemplary embodiment of a steering column assembly having a plurality of adaptors wherein each adaptor is engageable with a single electrical communication receptacle and each adaptor is operable to receive a different electronic peripheral device.

Referring now to FIG. 7, a steering column assembly 24c for a vehicle includes a steering column member 26c for supporting rotation of a steering shaft in a vehicle, such as steering shaft 28 in FIG. 1. The steering column assembly 24c also includes a first electrical communication receptacle 30c fixed relative to the steering column member 26c. The first electrical communication receptacle 30c receives an electronic peripheral device on the steering column member 26c, such as any of the electronic peripheral devices 32a, 34a, 36c, 38c, 40c, 42c, 44a, set forth in greater detail below or above and shown in the various figures. The first electrical communication receptacle 30c electrically connects one of the electronic peripheral devices 32a, 34a, 36c, 38c, 40c, 42c, 44a with a control system of the vehicle, such as control system 10 shown in FIG. 1.

The steering column member 26c includes an upwardly facing surface 46c and the first electrical communication receptacle 30c is further defined as being disposed adjacent to the upwardly facing surface 46c. In other words, the weight of the received electronic peripheral device 32a, 34a, 36c, 38c, 40c, 42c, 44a is supported by the steering column member 26c. The steering column member 26c is further defined as being adjustable in tilting movement 48c and telescoping movement 50c. The first electrical communication receptacle 30c moves with the steering column member 26c during tilting movement 48c and during telescoping movement 50c. The steering column assembly 24c also includes a shroud 52c at least partially covering the steering column member 26c. The first electrical communication receptacle 30c extends through the shroud 52c.

The steering column assembly 24c includes a plurality of differently configured adaptors 56c, 58c, 60c, 62c. Each adaptor 56c, 58c, 60c, 62c is engageable with the first electrical communication receptacle 30c. Also, each adaptor 56c, 58c, 60c, 62c and is operable to receive a differently configured electronic peripheral device 32a, 34a, 36c, 38c, 40c, 42c, 44a. For example, an electronic peripheral device 36c is engagable with the first electrical communication receptacle 30c and is operable to display vehicle diagnostic data. The electronic peripheral device 36c can show, with text or graphics, data corresponding to one or more of engine revolutions per minute, coolant temperature, and/or oil pressure. The electronic peripheral device 36c may also be operable to tap into the control system to show other categories that are not traditionally shown, such as tire pressure and engine oil quality. The electronic peripheral device 36c may also be operable to tap into the control system to show data that was previously acted on by the control system without communication to the driver, such as events that might cause a "check engine" light to illuminate.

Figure 8:
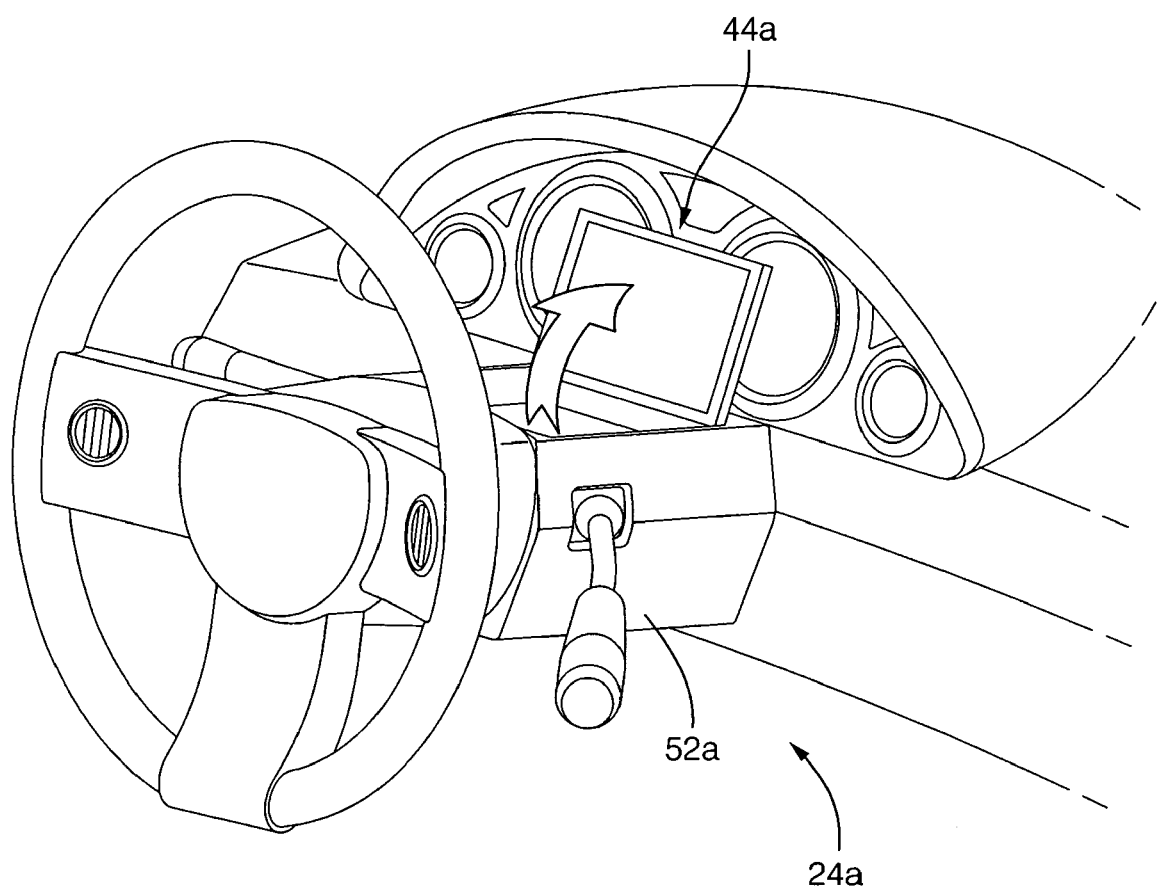
FIG. 8 is a perspective view of the second exemplary embodiment of an electronic peripheral device operable to pivot about hinge axis.

FIG. 8 shows an electrical peripheral device 44a that pivots about a pivot axis to tilt between a showed, display position and a closed position. The electrical peripheral device 44a can be in the form of a display screen operable to display images from one or more cameras or other devices associated with the vehicle.

In another example, the electronic peripheral device 38c is in the form of an MP3 player, such as an IPOD™. The electronic peripheral device 38c is received in the adaptor 58c and the adaptor 58c is received in the first electrical communication receptacle 30c. The electronic peripheral device 38c is operable to communicate electronic files through first electrical communication receptacle 30c. The electronic peripheral device 40c is in the form of a satellite radio receiver. The electronic peripheral device 40c is received in the adaptor 60c and the adaptor 60c is received in the first electrical communication receptacle 30c. The electronic peripheral device 40c is operable to communicate electronic music data through first electrical communication receptacle 30c. The electronic peripheral device 40c can be assist in receiving a satellite signal through the connection to the antenna 22 through the first electrical communication receptacle 30c.

In another example, the electronic peripheral device 42a is in the form of a navigation device. The electronic peripheral device 42a is operable to receive a global position of the steering column member 26c. In other words, since the vehicle, the electronic peripheral device 42a, and the steering column member 26c are approximate, the global position of one corresponds to the global position of all. The electronic peripheral device 42a may receive global position data from the control system of the vehicle through a communication line, such as communication line 62a in FIG. 4, or may include a self-contained global positioning system.

Electrical peripheral devices engageable with any embodiment of the first electrical communication receptacles set forth above, including but not limited to the electrical peripheral devices set forth above, can be powered and/or recharged through the connection to the power/ground source 20 through the first electrical communication receptacle. The respective adaptors can be constructed to regulate charge to the particular electrical peripheral device.

Figure 9:
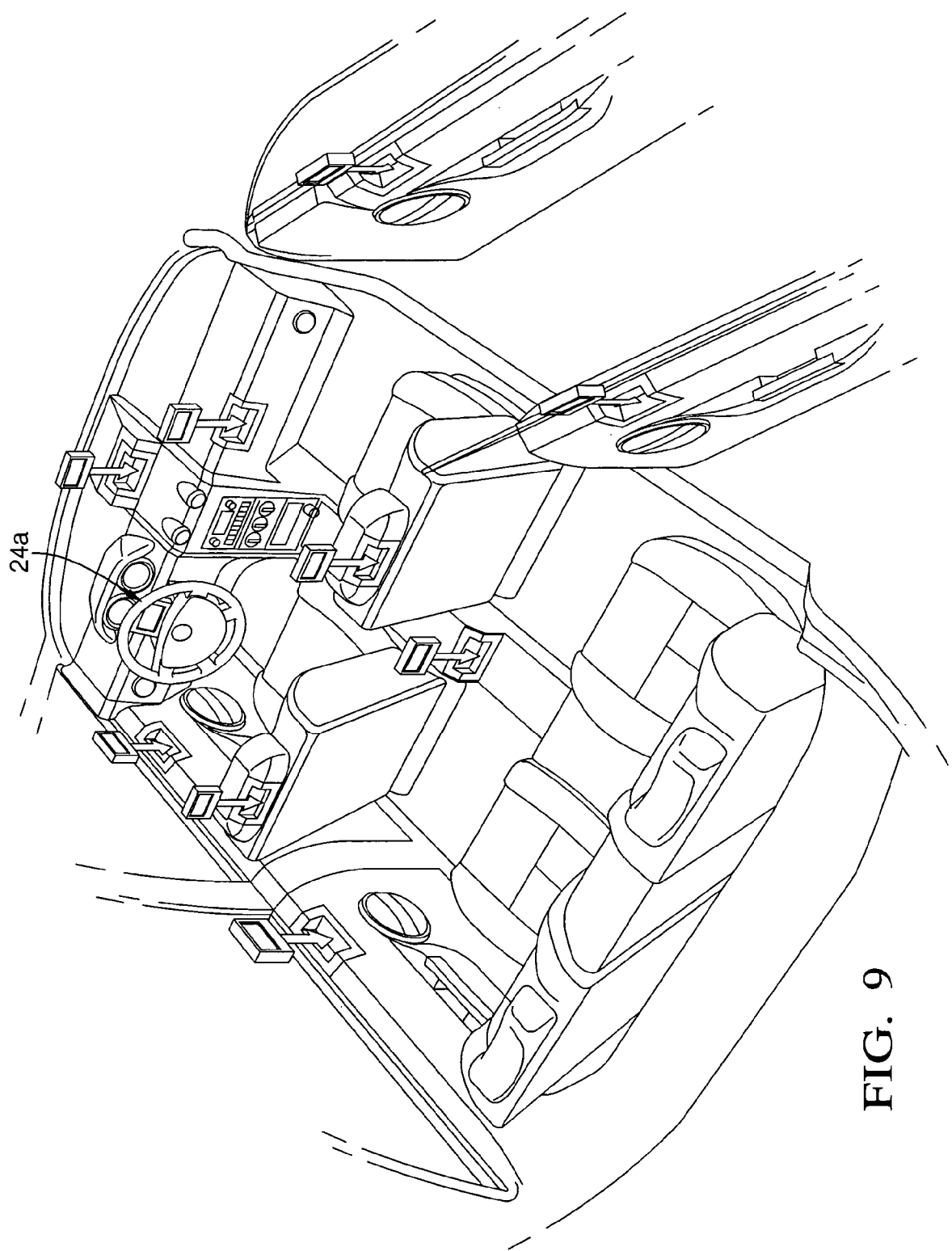
FIG. 9 is a perspective view of a vehicle interior having a plurality of electrical communication receptacles disposed about the passenger compartment.

FIG. 9 shows a vehicle interior compartment of a vehicle. The steering column assembly 24a is disposed in the interior compartment. A plurality of electrical communication receptacles, each similar to the first electrical communication receptacle 30a, are disposed throughout the interior compartment. Occupants of the vehicle plug electronic peripheral devices in the various electrical communication receptacles disposed throughout the interior compartment.

Figure 10:
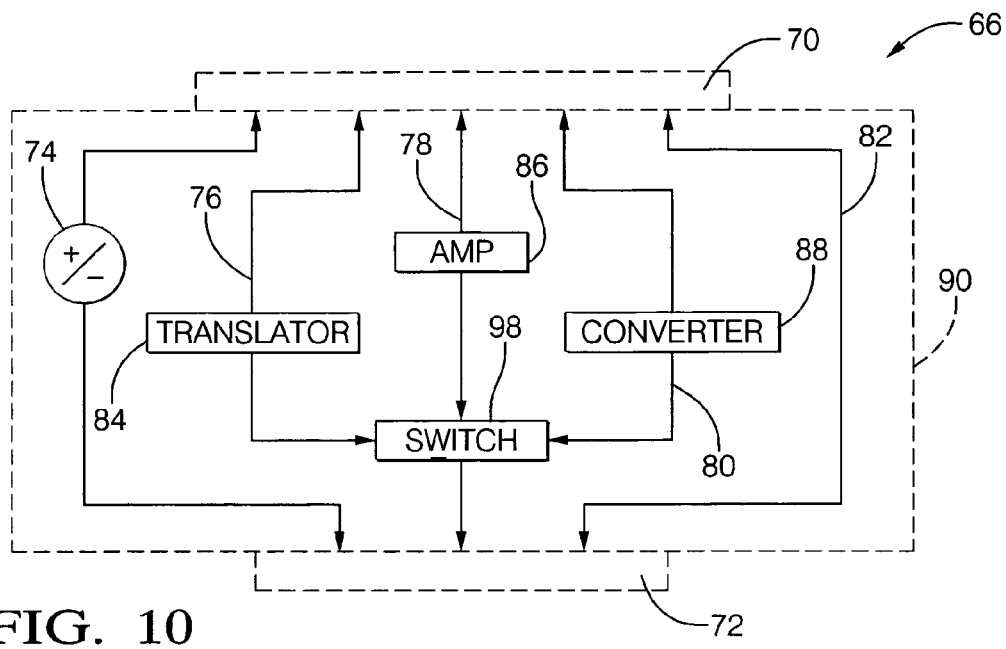
FIG. 10 is schematic diagram of a third exemplary communications interface module for communicating signals between an electronic peripheral device and a control system of the vehicle.

Referring now to FIGS. 1 and 10, a communications interface module 66 is mountable in a vehicle. The communications interface module 66 facilitates communication between the control system 10 and the electronic peripheral device received by the first electrical communication receptacle 30. The communications interface module 66 includes a first electrical interface 70 for electrically communicating with the control system 10. The first electrical interface 70 can be a plug-like connector or can be a permanent electrical connection. The communications interface module 66 also includes a second electrical interface 72 spaced from the first electrical interface 70 for being positioned in a passenger compartment of a vehicle. In the exemplary embodiment, the first electrical interface 70 is the first electrical communication receptacle 30.

The communications interface module 66 also includes a plurality of communication lines 74, 76, 78, 80, 82 extending in parallel between the first electrical interface 70 and the second electrical interface 72. The plurality of communication lines 74, 76, 78, 80, 82 exchange a plurality of different communication formats between the first electrical interface 70 and the second electrical interface 72. For example, a first communication line 74 communicates electrical power and electrical grounding from the first electrical interface 70 to the second electrical interface 72. As a result, the electronic peripheral device received by the first electrical communication receptacle 30 can be powered and/or recharged while engaged with the first electrical communication receptacle 30.

A second communication line 76 extends between the first electrical interface 70 and the second electrical interface 72 for communicating serial and parallel data in two directions between the first electrical interface 70 and the second electrical interface 72. In other words, the communications interface module 66 can facilitate the transmission of data from the electronic peripheral device to the control system and from the control system to the electronic peripheral device. A translator 84 disposed along the second communication line 76. The translator 84 is operable to convert a first communication protocol received from the second electrical interface 72 to a second communication protocol different than the first communication protocol and for emitting the converted communication protocol to the first electrical interface 70. In other words, if the electronic peripheral device communicates in a different language from the control system of the vehicle, the translator can convert the language of the electronic peripheral device to the language used by the control system of the vehicle. The translator 84 can be operable to translate the first communication protocol received from the second electrical interface 72 from the electronic peripheral device to controller area network protocol, class 2 protocol, and keyword protocol.

A third communication line 78 extends between the first electrical interface 70 and the second electrical interface 72 for communicating discrete signals in two directions between the first electrical interface 70 and the second electrical interface 72. For example, discrete command signals can be communicated across the third communication line. Command signals can be communicated in binary form. An amplifier 86 is disposed along the exemplary third communication line 78. The amplifier is operable to amplify signals received from the second electrical interface 72 and direct the amplified signal to the first electrical interface 70.

A fourth communication line 80 extends between the first electrical interface 70 and the second electrical interface 72 for communicating analog/digital conversions in two directions from the first electrical interface 70 to the second electrical interface 72. A converter 88 is disposed along the fourth communication line 80 for converting analog signals received from the first electrical interface 70 to a digital signal. For example, signals emitted by sensors 12 may be in analog format. These signals can be received by the module 66, directed along the fourth communication line 80, converted to digital format (if desired), and directed to the second electrical interface 72. On example of two-directional communication along the analog/digital fourth communication line 80 could relate to controlling a dimmable light.

A fifth communication line 82 extends between the first electrical interface 70 and the second electrical interface 72 for communicating unmodified signals in two directions between the first electrical interface 70 and the second electrical interface 72. For example, the fifth communication line 82 can communicate with the antenna 22 to direct radio signals to the electronic peripheral device received in the first electrical communication receptacle 30.

Figure 11:
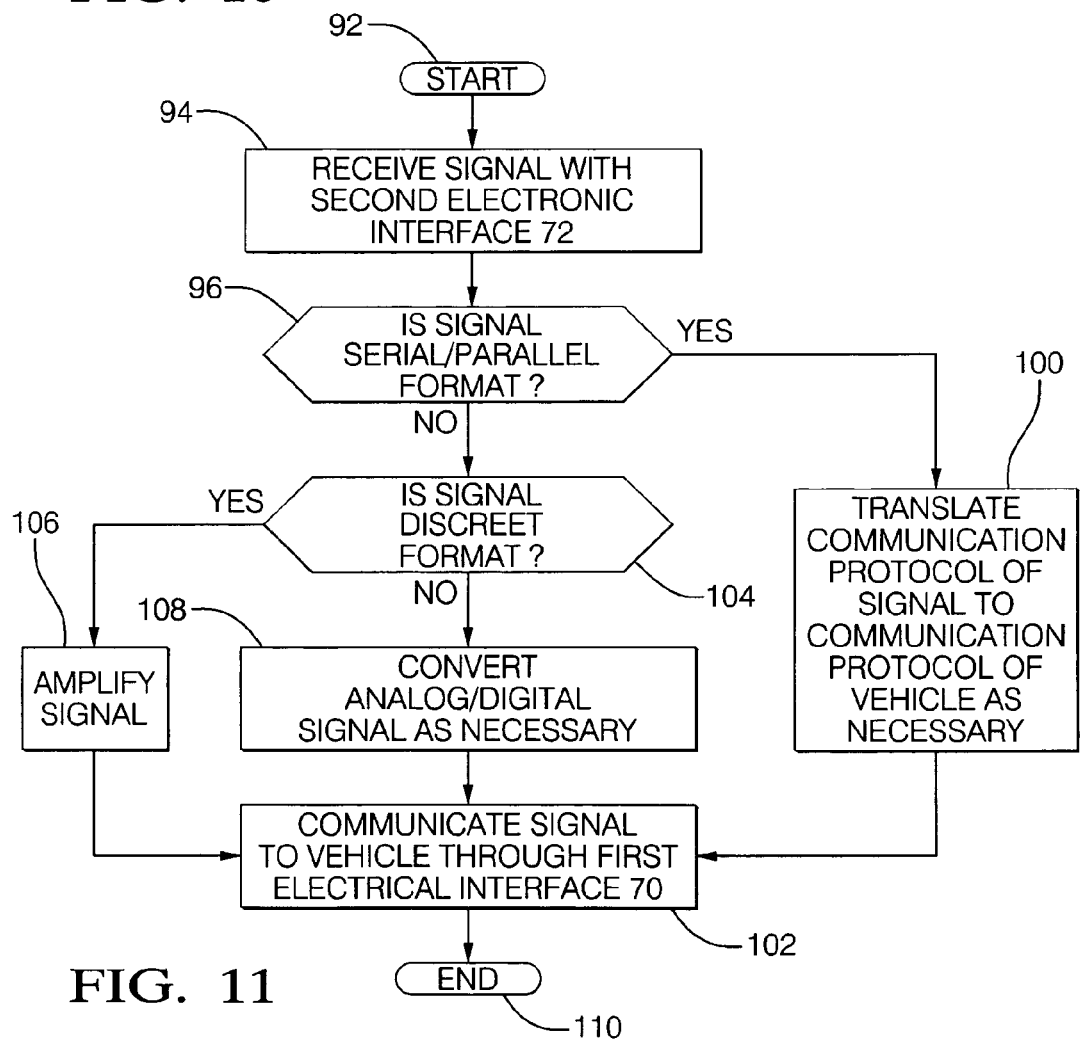
FIG. 11 is a simplified flow diagram showing steps performed by the first exemplary communications interface module for communicating signals received from an electronic peripheral device to the control system of the vehicle.

FIG. 11 is a simplified flow diagram of an exemplary process followed by the exemplary communications interface module 66. The process starts at step 92. At step 94, the communications interface module 66 receives a signal from the electronic peripheral device with the second electrical interface 72. Prior to step 94, the electronic peripheral device can be plugged into the first electrical communication receptacle 30 (the second electrical interface 72).

At step 96, the communications interface module 66 determines if the signal is of serial/parallel data format. As shown in FIG. 10, the communications interface module 66 includes a switch 98 to direct the signal to the appropriate communication line. A similar switch can be disposed adjacent the first electrical interface 70.

If the signal is in serial/parallel data format, the switch 98 directs the signal to the second communication line 76 and the process continues to step 100. At step 100, the translator 84 translates the communication protocol of the signal received from the electronic peripheral device to a communication protocol of the vehicle as necessary. The translated signal is then communicated to the control system 10 through the first electrical interface 70 at step 102.

If the signal is not in serial/parallel data format at step 96, the process continues to step 104 and the communications interface module 66 determines if the signal is in discrete format. If so, the switch 98 directs the signal to the third communication line 78 and the process continues to step 106. At step 106, the signal is amplified by the amplifier 84. The amplified signal is then communicated to the control system 10 through the first electrical interface 70 at step 102.

If the signal is not in discrete format at step 104, the process continues to step 108 and the switch 98 directs the signal to the fourth communication line 80. The signal can be converted from digital format to analog format or can be converted from analog format to digital format, as necessary, by the converter 88. The converted signal is then communicated to the control system 10 through the first electrical interface 70 at step 102. The process ends at step 110.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A communications interface module mountable in a vehicle comprising:
    a housing for mounting in a vehicle;
    a first electrical interface engaged with said housing for electrically communicating with a control system of a vehicle, the first electrical interface for receiving a selected electronic peripheral device from a plurality of different electronic peripheral devices, one of the plurality of different electronic peripheral devices communicates in first communications protocol and at least one other of the plurality of different electronic peripheral devices communications in a second communication protocol;
    a second electrical interface engaged with said housing and spaced from said first electrical interface for being positioned in a passenger compartment of a vehicle;
    a plurality of communication lines extending in said housing between said first electrical interface and said second electrical interface for exchanging a plurality of different communication formats between said first electrical interface and said second electrical interface; and,
    a switch coupled between the plurality of communication lines and one of the first and second electrical interfaces, the switch for receiving a signal from one of the first and second electronic interfaces, automatically determining the communications protocol being used by the received signal, and automatically directing the signal to an appropriate one of the plurality of communications lines.

2. The communications interface module of claim 1 wherein said plurality of communication lines includes a first communication line extending between said first electrical interface and said second electrical interface for communicating electrical power and electrical grounding from said first electrical interface to said second electrical interface.

3. The communications interface module of claim 1 wherein said plurality of communication lines includes a second communication line extending between said first electrical interface and said second electrical interface for communicating serial and parallel data in two directions between said first electrical interface and said second electrical interface.

4. The communications interface module of claim 3 further comprising:
    a translator disposed along said second communication line operable to convert a first communication protocol received from said second electrical interface to a second communication protocol different than said first communication protocol and for emitting the converted communication protocol to said first electrical interface.

5. The communications interface module of claim 4 wherein said translator is further defined as being operable to translate the first communication protocol received from said second electrical interface to controller area network protocol, class 2 protocol, and keyword protocol.

6. The communications interface module of claim 1 wherein said plurality of communication lines includes a third communication line extending between said first electrical interface and said second electrical interface for communicating discrete signals in two directions between said first electrical interface and said second electrical interface.

7. The communications interface module of claim 6 wherein said third communication line is further defined as communicating binary information.

8. The communications interface module of claim 7 further comprising:
    an amplifier disposed along said third communication line and operable to amplify signals received from said second electrical interface and direct said amplified signal to said first electrical interface.

9. The communications interface module of claim 1 wherein said plurality of communication lines includes a fourth communication line extending between said first electrical interface and said second electrical interface for communicating analog/digital conversions in at least one direction from said first electrical interface to said second electrical interface.

10. The communications interface module of claim 9 further comprising:
    a converter disposed along said fourth communication line for converting analog signals received from said first electrical interface to a digital signal.

11. The communications interface module of claim 1 wherein said plurality of communication lines includes a fifth communication line extending between said first electrical interface and said second electrical interface for communicating unmodified signals in two directions between said first electrical interface and said second electrical interface.

12. A method for placing a control system of a vehicle in electronic communication with an electronic peripheral comprising the steps:
    electrically communicating with a control system of the vehicle with a first electrical interface;
    positioning a second electrical interface in a passenger compartment of the vehicle spaced from the first electrical interface for electrically receiving an electronic peripheral, the second electrical interface for receiving a selected electronic peripheral device from a plurality of different electronic peripheral devices, one of the plurality of different electronic peripheral devices communicates in first communications protocol and at least one other of the plurality of different electronic peripheral devices communications in a second communication protocol;
    extending a plurality of communication lines in parallel between the first electrical interface and the second electrical interface for exchanging a plurality of different communication formats between the first electrical interface and the second electrical interface;
    receiving a signal at a switch from one of the first and second electronic interfaces, the switch being coupled between the plurality of communication lines and one of the first and second electrical interfaces; and automatically determining the communications protocol being used by the received signal and automatically directing the signal to an appropriate one of the plurality of communications lines.

13. The method of claim 12, wherein the signal is of a type selected from the group consisting of a serial/parallel data signal, a discrete signal, an analog signal and a digital signal.

14. The method of claim 13 wherein the step of determining the communications protocol being used includes the steps of:

determining the type of signal as being one of a serial/parallel data signal, a discrete signal, and an analog/digital convertible signal; and directing the signal to a specific one of the plurality of communication lines in response to said determining step.

15. The method of claim 14 wherein said determining step is further defined as determining the type of signal as being a serial/parallel data signal.

16. The method of claim 15 further comprising the steps of:

directing the serial/parallel data signal along a second communication line of the plurality of communication lines;

translating a communication protocol of the serial/parallel data signal to be compatible with a translation protocol of the control system of the vehicle; and emitting the translated serial/parallel data signal to the control system of the vehicle through the first electrical interface.

17. The method of claim 14 wherein said determining step is further defined as determining the type of signal as being a discrete signal.

18. The method of claim 17 further comprising the steps of:

directing the serial/parallel data signal along a third communication line of the plurality of communication lines;

amplifying the discrete signal; and emitting the amplified discrete signal to the control system of the vehicle through the first electrical interface.

19. The method of claim 14 wherein said determining step is further defined as determining the type of signal as being an analog/digital convertible signal.

20. The method of claim 19 further comprising the steps of:

directing the analog/digital convertible signal along a fourth communication line of the plurality of communication lines;

converting the analog/digital convertible signal from one of analog to digital and digital to analog; and emitting the converted analog/digital signal to the control system of the vehicle through the first electrical interface.

21. A communications interface module mountable in a vehicle comprising:

a housing for mounting in a vehicle;

a first electrical interface engaged with said housing for electrically communicating with a control system of the vehicle;

a second electrical interface engaged with said housing spaced from said first electrical interface for being positioned in a passenger compartment of the vehicle, the second electrical interface for receiving a selected electronic peripheral device from a plurality of different electronic peripheral devices, one of the plurality of different electronic peripheral devices communicates in first communications protocol and at least one other of the plurality of different electronic peripheral devices communications in a second communication protocol;

a first communication line extending in said housing between said first electrical interface and said second electrical interface for communicating electrical power and electrical grounding from said first electrical interface to said second electrical interface;

a second communication line extending in said housing between said first electrical interface and said second electrical interface for communicating serial and parallel data in two directions between said first electrical interface and said second electrical interface;

a third communication line extending in said housing between said first electrical interface and said second electrical interface for communicating discrete signals in two directions between said first electrical interface and said second electrical interface;

a fourth communication line extending in said housing between said first electrical interface and said second electrical interface for communicating analog/digital conversions in at least one direction from said first electrical interface to said second electrical interface;

a fifth communication line extending in said housing between said first electrical interface and said second electrical interface for communicating unmodified signals in two directions between said first electrical interface and said second electrical interface; and, a switch coupled between the communication lines and one of the first and second electrical interfaces, the switch for receiving a signal from one of the first and second electronic interfaces, automatically determining the communications protocol being used by the received signal, and automatically directing the signal to an appropriate one of the communications lines.

22. The communications interface module of claim 1 wherein said plurality of communication lines includes:

a second communication line extending in said housing between said first electrical interface and said second electrical interface for communicating serial and parallel data between said first electrical interface and said second electrical interface;

a third communication line extending in said housing between said first electrical interface and said second electrical interface for communicating discrete signals between said first electrical interface and said second electrical interface; and a fourth communication line extending in said housing between said first electrical interface and said second electrical interface for communicating analog/digital conversions from said first electrical interface to said second electrical interface.

* * * * *

UNITED STATES PATENT AND TRADEMARK OFFICE
CERTIFICATE OF CORRECTION

| | | |
|---|---|---|
| PATENT NO. | : 7,498,930 B2 | Page 1 of 1 |
| APPLICATION NO. | : 11/266975 | |
| DATED | : March 3, 2009 | |
| INVENTOR(S) | : Timothy M. Phillips et al. | |

It is certified that error appears in the above-identified patent and that said Letters Patent is hereby corrected as shown below:

In Column 9, line 33, please replace "in first communications" with
  -- in a first communication --

In Column 9, line 35, please replace "communications" with -- communicates --

In Column 9, line 49, please replace "communications" with -- communication --

In Column 9, line 51, please replace "communications" with -- communication --

In Column 10, line 57, please replace "in first communications" with
  -- in a first communication --

In Column 10, line 59, please replace "communications" with -- communicates --

In Column 11, line 6, please replace "communications" with -- communication --

In Column 12, starting on line 5 to line 6 please replace "in first communications" with
  -- in a first communication --

In Column 12, line 8, please replace "communications" with -- communicates --

In Column 12, starting on line 37 to line 38, please replace "communications" with
  -- communication --

In Column 12, line 40, please replace "communications" with -- communication --

Signed and Sealed this

Twelfth Day of May, 2009

JOHN DOLL
*Acting Director of the United States Patent and Trademark Office*